(12) United States Patent
Lin

(10) Patent No.: US 6,298,451 B1
(45) Date of Patent: Oct. 2, 2001

(54) DIRECTORY-BASED FAILURE RECOVERY AND LOAD BALANCING SYSTEM

(75) Inventor: Horng-Dar Lin, San Jose, CA (US)

(73) Assignee: iDini Corporation, San Jose, CA (US)

( * ) Notice: Subject to any disclaimer, the term of this patent is extended or adjusted under 35 U.S.C. 154(b) by 0 days.

(21) Appl. No.: 09/432,491

(22) Filed: Nov. 2, 1999

(51) Int. Cl.$^7$ .......................... H02H 3/05; H03K 19/003
(52) U.S. Cl. ..................... 714/4; 714/2; 714/47
(58) Field of Search ............................. 714/4, 2, 15, 16, 714/34, 47; 709/105, 106, 203

(56) References Cited

U.S. PATENT DOCUMENTS

| | | | |
|---|---|---|---|
| 5,167,035 | * 11/1992 | Mann et al. ............................. | 714/4 |
| 5,553,242 | * 9/1996 | Russell et al. ........................... | 714/4 |
| 5,617,570 | * 4/1997 | Russell et al. ......................... | 395/684 |
| 5,966,715 | * 10/1999 | Sweeney et al. ..................... | 707/203 |
| 5,978,577 | * 11/1999 | Rierden et al. ....................... | 395/610 |
| 6,044,465 | * 3/2000 | Dutcher et al. ....................... | 713/200 |

* cited by examiner

Primary Examiner—Dieu-Minh Le
(74) Attorney, Agent, or Firm—Fenwick & West, LLP

(57) ABSTRACT

A method is described wherein tasks are managed in a hierarchical fashion using multiple directories servers and multiple resource management servers each of the directory servers and management servers having either distinct or overlapping responsibilities. The method includes determining that a client computer requires that a first task be performed by a server computer configured to handle that first task, causing the client computer to query the directory server to determine which servers within the plurality of servers is configured to handle the first task, causing the directory server to determine at least one server within the plurality of servers which is configured to handle the first task, and to transmit specific information about the at least one server to the client computer. The method proceeds with causing the client computer to transmit a task request to a preferred server chosen from the at least one servers.

16 Claims, 4 Drawing Sheets

DIRECTORY-BASED FAILURE RECOVERY AND LOAD BALANCING SYSTEM

BACKGROUND OF THE INVENTION

1. Field of the Invention

The present invention provides a distributed method for managing the assignment of tasks to servers in order to efficiently control server loads and provide for failure recovery in the case of server failure.

2. The Background Art

In electronic systems employing servers to perform mission critical tasks, it is often very important that those tasks are performed in the least amount of time. As the number of those tasks increases, it often becomes necessary to provide multiple servers to handle those tasks. In addition, as the number of requests for the various tasks increases, it often becomes necessary to provide additional servers to handle the higher volume of tasks. It is also necessary that the performance of critical tasks be completely assured, even in the case of server failure.

Since a given task may be required to be performed more often than one or more other tasks, the number of servers that are capable of performing that first task may be greater than the number of servers capable of performing those other tasks.

Each server is typically capable of handling many different types of tasks. In order to insure that the maximum efficiency of a server system is attained, a task manager or gateway is typically provided between a client computer and the one or more servers performing tasks for the client computer.

FIGS. 1A and 1B show an example of operating a typical prior art server system.

Referring to FIG. 1A, prior art system 10 includes client computer 12, gateway computer 14, and servers 16, 18, 20 and 22. In this prior art example, servers 16, 18, 20, and 22 are each configured to perform tasks within overlapping groups. For example, server 16 may be capable of performing tasks A and B. Server 18, in addition to being configured to perform tasks A and B, is configured to perform tasks C, D, and E. Server 20 is configured to perform tasks C, D, and E, in addition to tasks F, G, and H. Finally, server 22 is configured to perform tasks A, B, G, and H.

In this example, tasks A and B are able to be performed on three of the four servers, indicating that those tasks are either performed with high regularity, or are mission critical and thus must be able to be performed by many different servers in case one or more of those servers have a failure.

When a task is required to be performed in a prior art server system, a client computer such as client computer 12 issues a service request to a gateway such as gateway 14. Gateway 14 then chooses a server from a list of available servers contained therein, and assigns the requested service to that server, such as server 20 as seen in FIG. 1B, and server 20 then performs the desired service. Once the service is performed, any data resulting from the performance of that service is passed back to the requesting client computer.

It is important that gateway 14 maintain an accurate list of active servers, so that a task isn't assigned to a failed server. In order for gateway 14 to have an accurate list at any given time of servers which are active and thus failure free, gateway 14 performs a verification through a simple communications means such as a ping. As those of ordinary skill in the art are readily aware, a ping is a simple data packet transmitted from a first network object to a second network object which stimulates a simple response from the second network object which tells the first network object that the second object is active. If gateway 14 continues to receive ping responses from any or all of servers 16, 18, 20, and 22, gateway 14 will keep each of those servers on its list of active servers. Failure to receive a predetermined number of consecutive pings from a given server, server 18 for example, will result in gateway 14 removing that server from the list of active servers. Future service requests, such as for the performance of task B, that would otherwise have been directed to the failed server 18 would then instead be directed to a back-up server such as server 20.

In single processor environments, gateway 14 is configured to include information about actual physical server connections, a mechanism to survey the connections and status of the servers, and an assignment mechanism to assign service requests to particular server connections with a tightly coupled control.

In parallel computing environments, the active server list kept by gateway 14 is typically includes detailed information about the location of servers which can perform the various tasks. That detailed information often includes the processor number, slot number, machine number, physical port number, etc. The communications methods employed in these multiprocessor situations is often integrated into the operating system kernel in order to achieve maximum processing efficiency.

In addition to keeping a list of active servers, gateway 14 is also responsible for load balancing. Load balancing is used to spread out data traffic or a computing load across various capable machines. Thus, in the example above with respect to tasks A and B, servers 16, 18, and 20 are all capable of performing those tasks. If a request for task A arrives at gateway 14 from a client computer such as client computer 12, gateway 14 may choose from among servers 16, 18, and 20 for the performance of task A. Thus, if server 16 is busy and perhaps has several other service requests pending which have not yet been performed, but server 18 is either idle or has fewer requests pending, gateway 14 would assign this task A to be performed by server 18 instead of by server 16, in order to balance the computing load. Other lower-level load balancing techniques are known to those of ordinary skill in the art.

While the prior art systems are useful for their intended purposes, in order for those systems to work, gateway 14 must be tightly coupled to each server, and know the status of each server on a moment by moment basis. It would be beneficial to provide a system for performing task assignments, fail-over, and load balancing using a system which can be more loosely coupled but also operates very efficiently. The present invention provides such a system.

SUMMARY OF THE INVENTION

A method is described wherein tasks are managed in a hierarchical fashion using multiple directories servers and multiple resource management servers each of the directory servers and management servers having either distinct or overlapping responsibilities. The method includes determining that a client computer requires that a first task be performed by a server computer configured to handle that first task, causing the client computer to query the directory server to determine which servers within the plurality of servers is configured to handle the first task, causing the directory server to determine at least one server within the plurality of servers which is configured to handle the first task, and to transmit specific information about the at least one server to the client computer. The method proceeds with causing the client computer to transmit a task request to a preferred server chosen from the at least one servers.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION OF ONE EMBODIMENT

Those of ordinary skill in the art will realize that the following description of the present invention is illustrative only and not in any way limiting. Other embodiments of the invention will readily suggest themselves to such skilled persons having the benefit of this disclosure.

The use of the same reference symbols in different figures indicates similar or identical items.

The present invention provides a server system that performs fail-over, load balancing in a distributed fashion. Resource manager services and server directories are provided in order that tasks requested by client computers may be performed quickly and efficiently. Resource manager services and directory services may be present on any reachable network server, and are distributed for fail-over protection and to ensure a high level of efficiency.

Traditional directory usage includes such applications as looking up user information such as telephone numbers, email address, service access rights, user groups, etc. The present invention expands this usage to include server location, services provided per server, and current loading (if known).

Figure 1A:
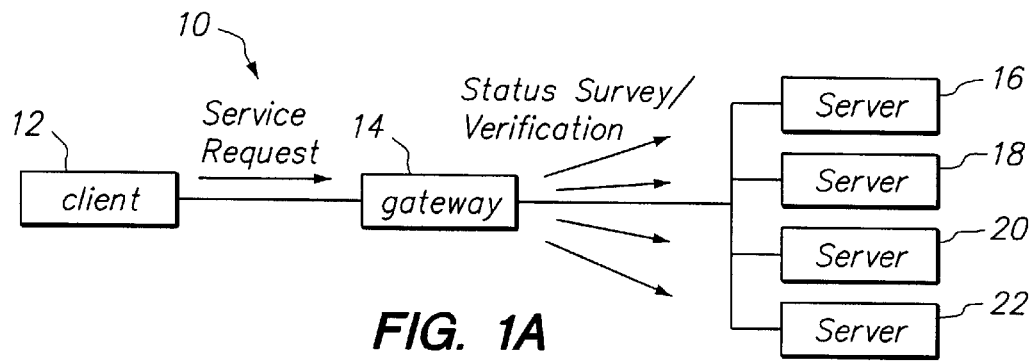
FIGS. 1A and 1B show an example of operating a typical prior art server system.
Figure 1B:
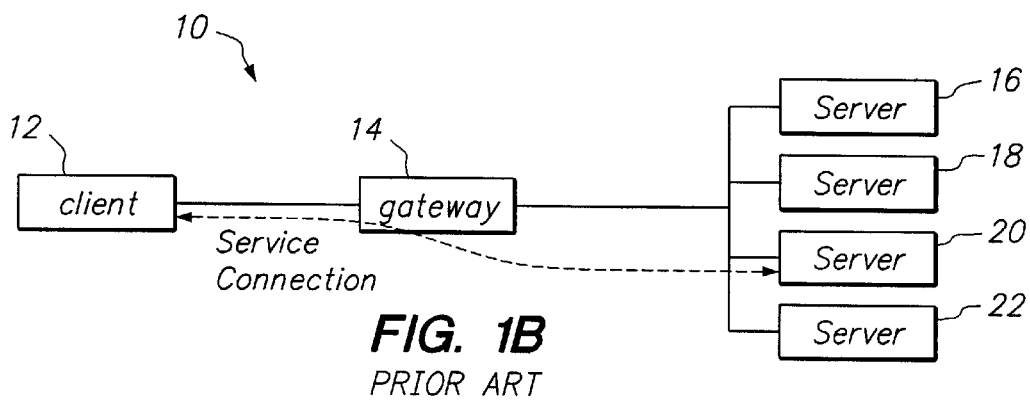
Figure 2:
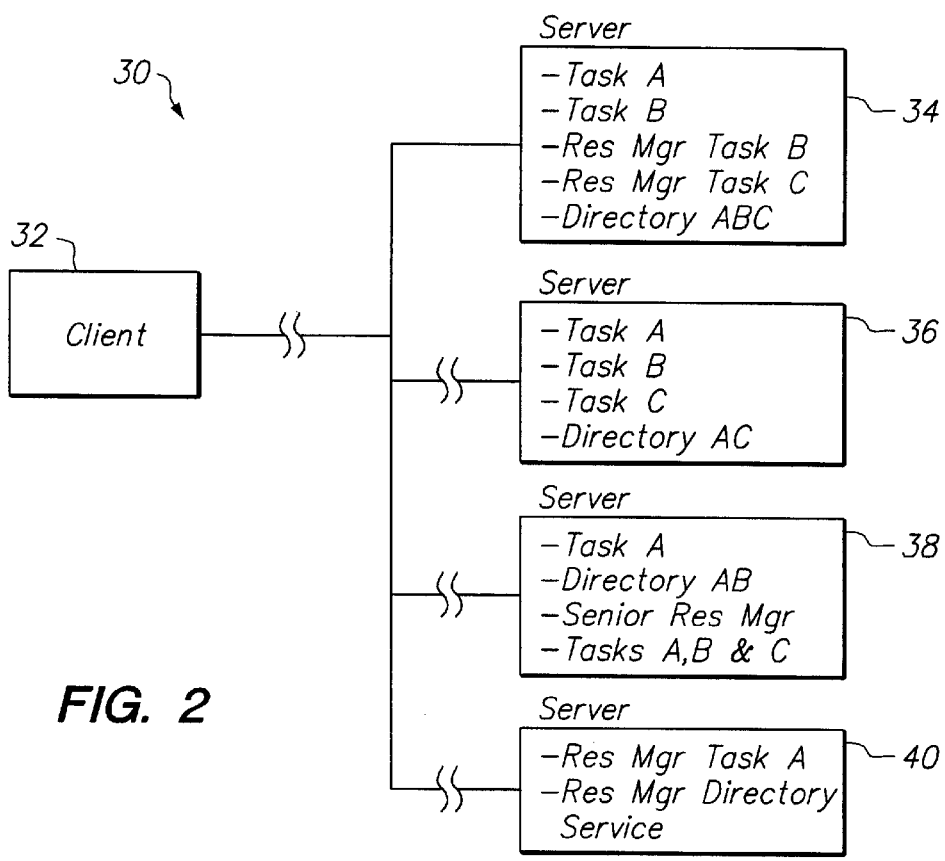
FIG. 2 shows a server system according to an embodiment of the present invention.

FIG. 2 shows a server system according to an embodiment of the present invention.

Referring to FIG. 2, system 30 includes client computer 32 and servers 34, 36, 38, and 40. The coupling between client computer 32 and each of servers 34, 36, 38, and 40 is very loose. As previously discussed, each of those servers 34, 36, 38, and 40 and client computer 32 may in fact be located thousands of miles apart. Prior part systems required a gateway computer which is not required by the present invention, and very tight coupling between that gateway computer and the servers which is also not required by the present invention.

In the example of FIG. 2, assume that server 34 is configured to perform tasks A and B. and has resource management processes running which manage servers configured to perform tasks B and C, and has a directory service which is capable of responding to client requests for information on servers which are configured to perform any of tasks A, B, or C.

A resource management process is a process which ensures that enough servers are running tasks which are in demand and necessary for the efficient operation of the system and also ensures that directory services have the correct data for tasks for which those particular directory services are responsible. Note that although server 34 is only configured to perform tasks A and B, there are processes running on server 34 which perform resource management for processes running on other servers. Further, it is important to note that the present invention provides for a hierarchical arrangement of tasks. This hierarchical arrangement of tasks will become clear in later paragraphs.

Note also that the directory process on server 34 is configured to respond to client computer requests indicating that the client computer desires information about servers configured to perform any of tasks A, B, or C even though server 34 is only configured to perform either of tasks A or B.

Continuing with the example of FIG. 2, assume that server 36 is configured to perform tasks A, B, and C, and has a process acting as a directory service which is capable of responding to client requests for information on servers which are configured to perform either of tasks A or C. Note that the directory service process running on server 36 is configured differently than the directory service process running on server 34. It is contemplated that directory service processes running on different servers may be configured the same or differently depending on system needs.

Assume that server 38 is configured to perform task A, has a process acting as a directory service which is capable of responding to client requests for information on servers which are configured to perform either of tasks A or B, and also has a process acting as a senior resource manager for tasks A, B, and C. The term "senior" as used herein is intended to convey the meaning that the resource manager process running on server 38 is essentially designed to manage all resource managers associated with tasks A, B, and C. Thus, the present invention includes a hierarchical arrangement of resource management processes, tasks, directories, etc. Though only two levels are shown in the hierarchy of the FIG. 2 example, it is contemplated that the hierarchy may extend many levels from the topmost management task to the lowest level task being managed.

Server 40 is configured to be a resource manager for task A, and a resource manager for directory services. A resource manager for directory services manages which servers perform directory services for which groups of tasks. For example, it is this resource manager for directory services on server 40 which determined that the directory server running on server 34 handles directory services for tasks A, B, and C.

Further, this same resource manager for directory services on server 40, also determined that the directory server running on server 36 handles directory services only for tasks A and C, and that the directory server running on server 38 handles directory services only for tasks A and B. Should there be a need for a different configuration in any of the directory servers running on any of servers 34, 36, or 38, the resource manager for directory services on server 40 would make that determination and cause the reconfiguration of one or more of the aforementioned directory servers in order to accommodate current needs.

Figure 3A:
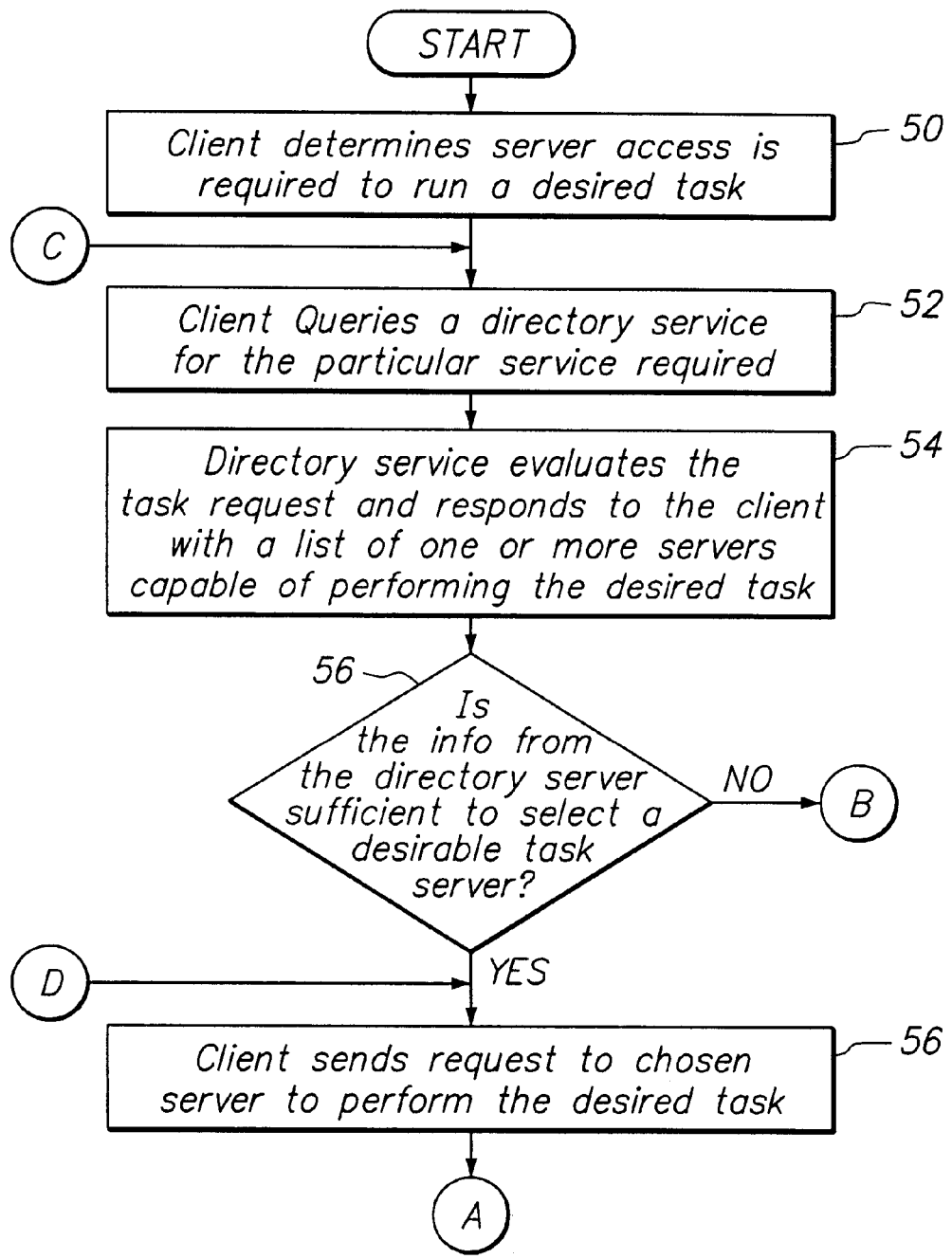
FIGS. 3A, 3B and 3C together are a flow chart showing a method of the present invention.
Figure 3B:
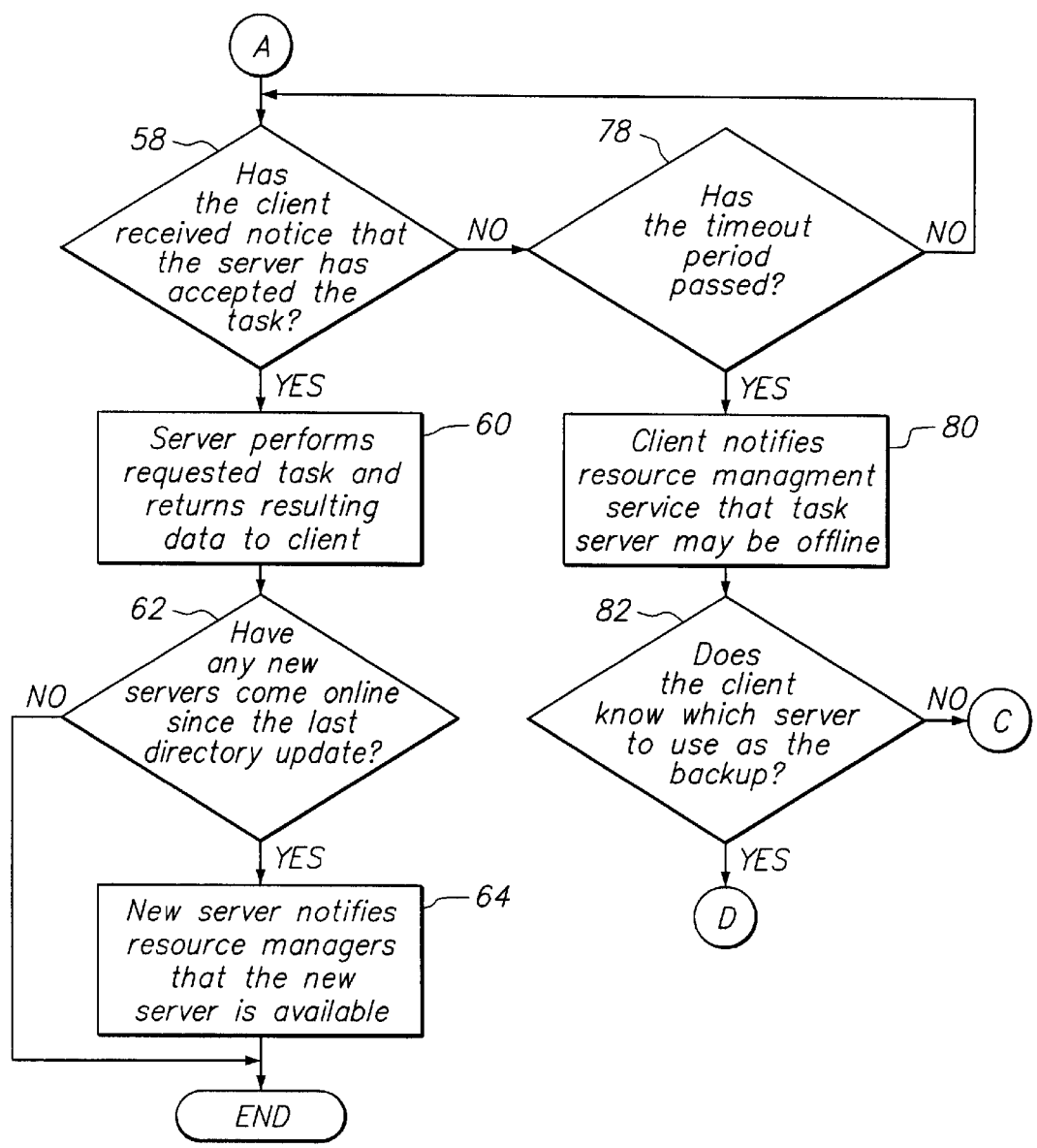
Figure 3C:
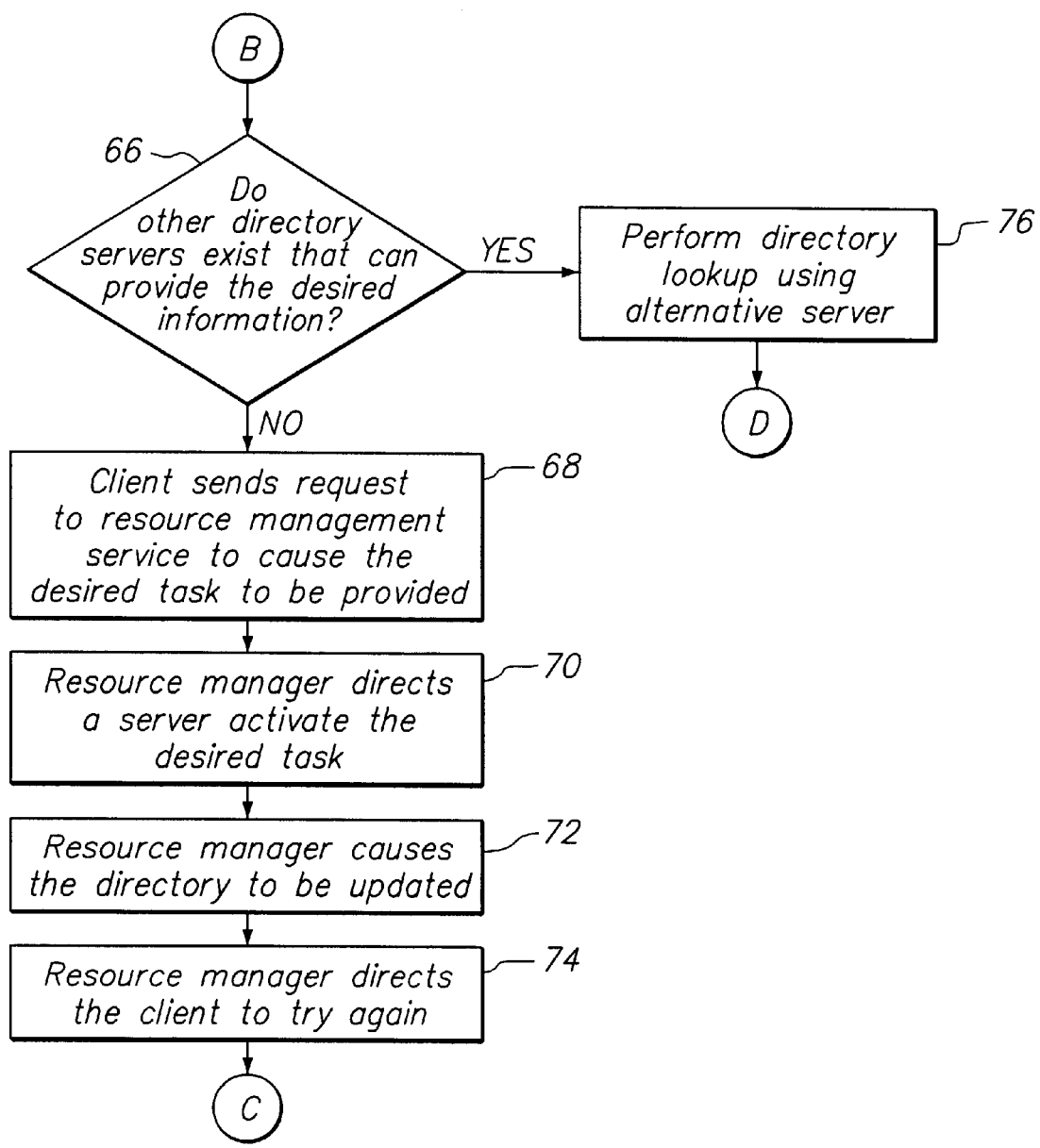

FIGS. 3A, 3B and 3C together are a flow chart showing a method of the present invention.

Referring to FIGS. 3A, 3B, and 3C together, the method begins at block 50 where a client computer determines that a task must be performed by a server computer.

At block 52, the client computer sends a query to a proper directory server with the relevant data regarding the service to be performed, the priority, and any other data deemed important to the selection of a server. At this step, a client may determine which is a proper directory server by querying a resource manager for that task. However, clients may also keep track of which directory servers are responsible for which tasks. Those of ordinary skill in the art having the benefit of this disclosure would readily realize that there are many ways for the client computer to determine which directory server to query.

At block 54, the directory server receiving the query from the client computer evaluates the query in order to determine the server or servers that are configured to handle the desired task. If multiple servers are configured to handle the desired task, those servers are ranked in order of desirability. For example, the most desirable server may be the server that presently has a minimal workload, or may instead be a server which is especially suited to the performance of the particular task as compared to the other servers which are configured to perform the task but which may not be specialized. The directory server then passes the information about those servers back to the client computer.

At block 56, the client computer determines whether the information received from the directory server is sufficient for the client computer to select a task server suitable to its needs. If yes, the method proceeds at block 58 when the client computer selects a server and sends a request to the selected server asking that the selected server perform the desired task.

At block 58, it is determined whether the client computer has received notification from the selected server that the selected server has agreed to perform the desired task. If yes, at block 60 the selected server performs the desired task and returns resulting data to the client computer.

At block 62, it is determined whether any new servers have come online since the last directory update. If yes, the method proceeds at block 64 where the new server notifies one or more resource managers that the new server is available to perform tasks.

Assume that in use server has come online in the example system of FIG. 2. Since server 38 is running a process which is acting as a senior resource manager, a new server coming online would communicate its availability to the senior resource manager. The senior resource manager would then determine which tasks are most needed by system 30, and then direct the lower-level resource managers for those particular tasks to communicate with the new server and bring that new server online. Alternatively, the senior resource manager might take note that the new server is available, and cause the lower-level resource managers to determine which tasks would be performed by the new server.

If, at block 56, it is determined by the client computer that the information from the directory server is not sufficient to select a desirable task server, the method proceeds at block 66 where he is determined whether other directory servers exist that can provide the desired information. If no, the method proceeds at block 68 when the client computer sends a request to a resource manager for the desired task requesting that the desired information be developed or that the desired task be provided in the required manner.

At block 70, the resource manager causes one or more servers to activate the desired task in the manner required by the client computer. Correspondingly, at block 72, the resource manager causes the directory information in the directory servers corresponding to the desired task to be updated to include all of the relevant and required information. Relevant and required information may include such information as server loading, the distance of the server from other related servers such as directory servers and resource management servers, the processor speed, the memory size, permanent storage capacity, etc.

At block 74, the resource manager then directs the client computer to try again, and the method proceeds again at block 52.

If, at block 66, it is determined that other directory servers exist that can provide the desired information to the client computer, the method proceeds had blocked 76 where the client computer performs a directory lookup using an alternative directory server having the desired information. It is intended that's the client computer receives the desired data from this alternative directory server, and then the method proceeds had blocked 56 where the client computer requests a properly configured server to perform the desired task.

If, at block 58, it is determined that the client has not received notice that the chosen server has accepted the task, it is determined at blocks 78 whether a timeout period has passed during which the server should responded. If the timeout period has not passed, the method proceeds with the query of block 58. However, if the timeout period has passed, the method proceeds had block 80 when the client notifies the proper resource management service that the chosen server may be offline or not accepting tasks. It is contemplated by the inventor that when a resource management service is notified that a server is either offline or not accepting tasks, the resource management service will then communicate with that server in order to determine its status. Since resource management services are considered high-priority services, it is contemplated that resource management services may be able to communicate with servers when clients cannot.

At block 82, it is determined whether the client knows of a properly configured server to use as a backup server. If yes, the method proceeds that block 56 where the client sends a request to the desired backup server to perform the desired task. If no, the method proceeds at block 52 where the client queries the directory service responsible for the desired task in order to determine a server to use to perform that task.

It is contemplated by the inventor that the directory services and resource management services may be performed by servers internal to or external to the server pool that performs tasks such as tasks A, B, C, etc. described earlier. It is further contemplated by the inventor that multiple servers may perform the overlapping directory services such as seen in FIG. 2.

When describing a method of the present invention, and reference is made to a directory server being queried or updated, it is intended for this reference to encompass those situations where multiple servers might be performing directory services. Thus, where information is sent by new or updated servers to the directory server, it is intended that the information be transmitted by any means necessary to all directory servers. However, it is not necessarily important that the new information for each individual directory server be received directly from the corresponding server.

Those of ordinary skill in the art would readily recognize that directory servers, like resource management servers can be organized in a hierarchical fashion. One directory server acting as primary could receive new information about a new server or an updated server and then pass that information on to all other directory servers. A hierarchy of directory servers ensures that all directory servers remain informed of all data changes and data conflicts are resolved efficiently.

It is contemplated by the inventor that the directory service may be provided by one or more of the same servers which performed tasks such as tasks A, B, C, etc. However the directory service may be performed by any physical computing device capable of such function and which is able to communicate with the task servers. In the specific example of using the present invention to manage services provided by servers which are physically located great distances from each other, it is contemplated by the inventor that the directory server could be on the West Coast of United States but coupled to task servers in distant locations such as New York, Florida, and Taiwan. It is important to note that in the prior art it was required that the gateway computer 14 be tightly and physically coupled to the task servers 16, 18, 20, and 22.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. In a server system having a client computer, and a plurality of servers, at least one of the servers within said plurality being configured to operate a directory service, and at least one of the servers within said plurality being configured to operate a resource management service, each of said servers within said plurality configured to perform overlapping subsets of tasks chosen from a master group of tasks, a method for performing the assignment of tasks comprising:

determining that the client computer requires that a first task be performed by a server computer configured to handle that task;

causing the client computer to query the directory server to determine which of a set of servers within said plurality of servers is configured to handle said first task;

causing the directory server to determine at least one server of the set of servers which is configured to handle said task, and to transmit specific information about said at least one server to said set of client computer; and causing said client computer to transmit a task request to a preferred one of the servers chosen from said set of at least one server.

2. The method of claim 1 further comprising:

causing said client computer to start a countdown clock for a predetermined duration; and causing, in response to said client computer receiving a response from said preferred one server indicating acceptance of the task request, said countdown clock to be disabled.

3. The method of claim 2 further comprising:

causing, in response to expiration of said predetermined duration said client computer to transmit information to said resource management service indicating failure of said preferred one server to respond to the task request; and causing said directory server to remove said preferred server from said set of servers for said tasks.

4. The method of claim 2 further comprising:

causing, in response to expiration of said predetermined duration, said client computer to transmit information to said directory server indicating failure of said preferred one server to respond to the task request; and causing said directory server to change the status of said preferred one server within said set to inactive for said tasks.

5. In a server system having a client computer, and a plurality of servers, at least one of the servers within said plurality being configured to operate a directory service, and at least two of the servers within said plurality being configured to operate resource management services which control overlapping subsets of tasks chosen from a master group of tasks, at least two of said servers within said plurality configured to perform overlapping subsets of tasks chosen from said master group of tasks, a method for controlling the assignment of tasks comprising:

determining that the client computer requires that a first task be performed by a server computer configured to handle that task;

causing the client computer to query a directory server to determine which of a set of servers within said plurality of servers is configured to handle said first task;

causing the queried directory server to determine at least one server of the set of servers that is configured to handle said task, and to transmit information about said set of at least one server to said client computer;

causing, in response to insufficient information for said client computer to choose a server capable of performing said first task, said client computer to transmit a request to at least one resource management service to cause said at least one resource management service to cause a first server chosen from the set to become configured to perform said first task; and causing said client computer to transmit a request to said first server that said first task be performed.

6. The method of claim 5 further comprising causing said client computer to start a countdown clock for a predetermined duration;

causing, in response to said client computer receiving a response from said first server indicating acceptance of the task request, said countdown clock to be disabled.

7. The method of claim 6 further comprising causing, in response to expiration of said predetermined duration, said client computer to transmit information to said resource management service indicating failure of said first server to respond to said task request.

8. The method of claim 6 further comprising causing, in response to expiration of said predetermined duration, said client computer to transmit information to said directory server indicating failure of said first server to respond to said task request.

9. The method of claim 6 further comprising:

transmitting information to said directory server in response to said predetermined duration having expired to indicate that said at least one server is not responding to the task request.

10. In a server system having a client computer, and a plurality of servers, at least one of the servers within said plurality being configured to operate a directory service and at least one of the servers within said plurality being configured to operate a resource management service and each of said servers within said plurality being configured to perform overlapping subsets of tasks within a master group of tasks, a method for performing the assignment of tasks comprising:

determining that the client computer requires that a task be performed by a server computer configured to handle that task;

causing the client computer to query the directory server to determine which servers within said plurality of servers is configured to handle said task;

causing the directory server to determine at least one server within said plurality of servers which is configured to handle said task, and to transmit specific information about said at least one server to said client computer;

causing said client computer to transmit a task request to a preferred one of said plurality of servers.

11. The method of claim 10 further comprising:

initiating a countdown clock for a predetermined duration;

disabling said countdown clock in response to said preferred one of said plurality of server having accepted the task request.

12. The method for performing assigned tasks in the server system of claim 11 in which at least one of the plurality of servers is configured to operate a resource management service, the method further comprising:

transmitting information to said resource management service in response to said predetermined duration having expired to indicate that said preferred server is not responding to task requests; and causing said directory server to remove said preferred server from among said plurality of servers configured to perform the requested task.

13. The method of claim 11 further comprising:

causing said client computer to transmit information to said directory server in response to said predetermined duration having expired to indicate that said preferred server is not responding to the requested task; and causing said directory server to change the status of said preferred server to inactive for performing the requested task.

14. In a server system having a client computer, and a plurality of servers, at least one of the servers within said plurality being configured to operate a directory service, and at least one of the servers within said plurality being configured to operate a resource management service which controls overlapping subsets of tasks chosen from a master group of tasks, at least two of said servers within said plurality configured to perform overlapping subsets of tasks chosen from said master group of tasks, a method for controlling the assignment of tasks comprising:

determining that the client computer, requires that a task be performed by a server computer configured to handle that task;

causing the client computer to query a directory server to determine which of said plurality of servers is configured to handle said first task;

causing the queried directory server to determine that at least one of the plurality of servers is configured to handle said task, and to transmit information about said at least one server to said client computer;

causing said client computer to transmit a request to at least one resource management service responsive to said information not being sufficient for said client computer to choose a server capable of performing said task for causing said at least one resource management service to configure one of said plurality of servers to perform said task; and causing said client computer to transmit a request to said one of the plurality of servers to perform said task.

15. The method of claim 14 further comprising:

initiating a countdown clock for a predetermined duration; and disabling the countdown clock in response to said at least one server having accepted the task request.

16. The method of claim 15 further comprising:

transmitting information to said resource management service in response to said predetermined duration having expired to indicate that said at least one server is not responding to the task request.

\* \* \* \* \*